Feb. 5, 1924.

H. J. SCHMICK

SCREW AND GEAR MAKING MACHINE

Filed Dec. 31, 1921    3 Sheets-Sheet 1

1,482,621

Inventor
Henry J. Schmick,
By Emery, Booth, Janney & Varney
His Attorneys

Feb 5, 1924.

H. J. SCHMICK

SCREW AND GEAR MAKING MACHINE

Filed Dec. 31, 1921    3 Sheets-Sheet 2

1,482,621

Inventor
Henry J. Schmick,
By Emery, Booth, Janney & Varney
His Attorneys

Feb. 5, 1924. 1,482,621
H. J. SCHMICK
SCREW AND GEAR MAKING MACHINE
Filed Dec. 31, 1921 3 Sheets-Sheet 3
Fig. 3.
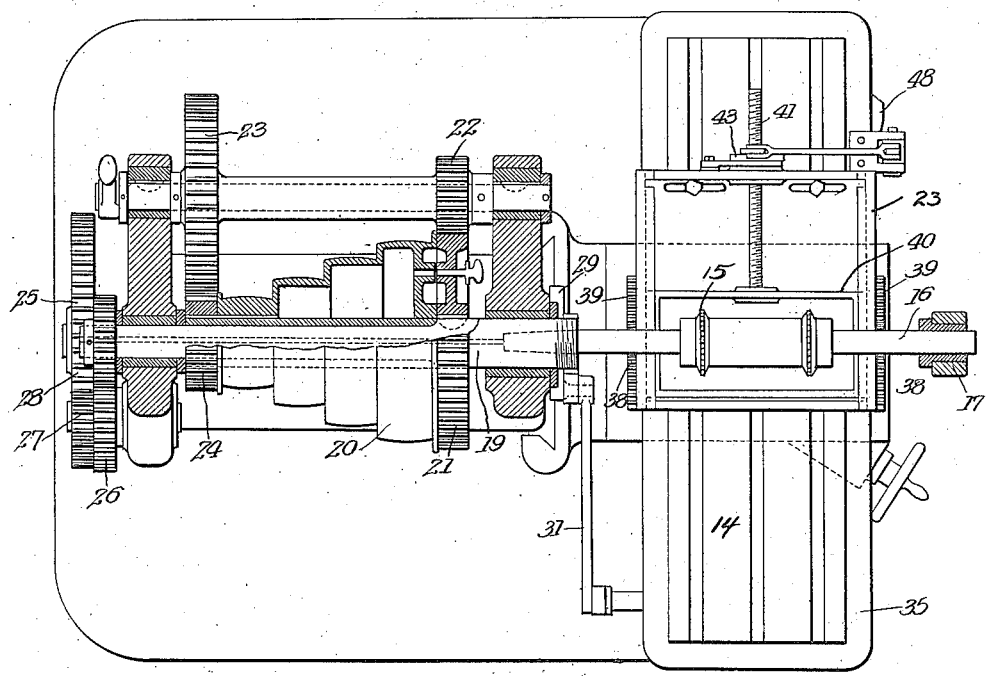
Fig. 5.
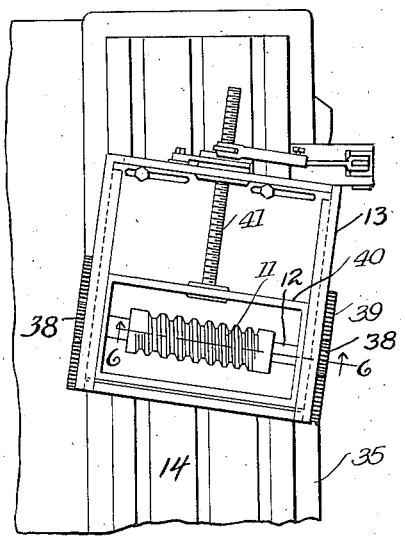
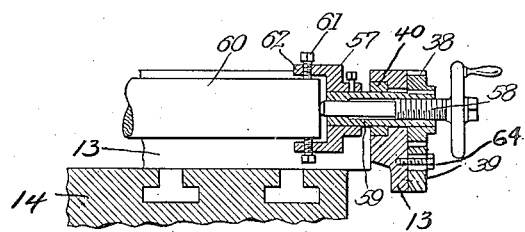
Fig. 6.
Inventor
Henry J. Schmick,
By Emery, Booth, Janney & Varney
His Attorneys Patented Feb. 5, 1924.

1,482,621

UNITED STATES PATENT OFFICE.

HENRY J. SCHMICK, OF WILLIAMSPORT, PENNSYLVANIA.

SCREW AND GEAR MAKING MACHINE.

Application filed December 31, 1921. Serial No. 526,327.

*To all whom it may concern:*

Be it known that I, HENRY J. SCHMICK, a citizen of the United States, residing at Williamsport, in the county of Lycoming and State of Pennsylvania, have invented an Improvement in Screw and Gear Making Machines, of which the following description, in connection with the accompanying drawings, is a specification, like characters on the drawings representing like parts.

This invention relates to improved means for generating gears, screws, grooved cams and similar devices, and to the articles produced thereby, and aims to obtain a more perfect article than could be produced by the methods and machines heretofore in use.

No claim is made herein for any product of this invention or process of making the same, such being subject matter of copending applications Serial Nos. 530,631 and 542,955, filed January 20, 1922 and March 11, 1922, respectively.

Further objects of the invention are to produce the article by means of a machine fully automatic in its operation, and to increase the speed and output of the machine.

Referring to the drawings, Fig. 1 is a side elevation of a preferred form of machine for making gears in accordance with the invention;

Fig. 3 is a horizontal section on the line 3—3 in Fig. 1, showing the reciprocating work table in plan view;

Fig. 5 is a plan view of the sliding table and frame carrying the work arbor showing the latter set at an angle less than 90° to the direction of movement of the table; and Fig. 6 is a vertical cross-section on the line 6—6 in Fig. 5 showing another arrangement for supporting the work blank.

Figure 1:
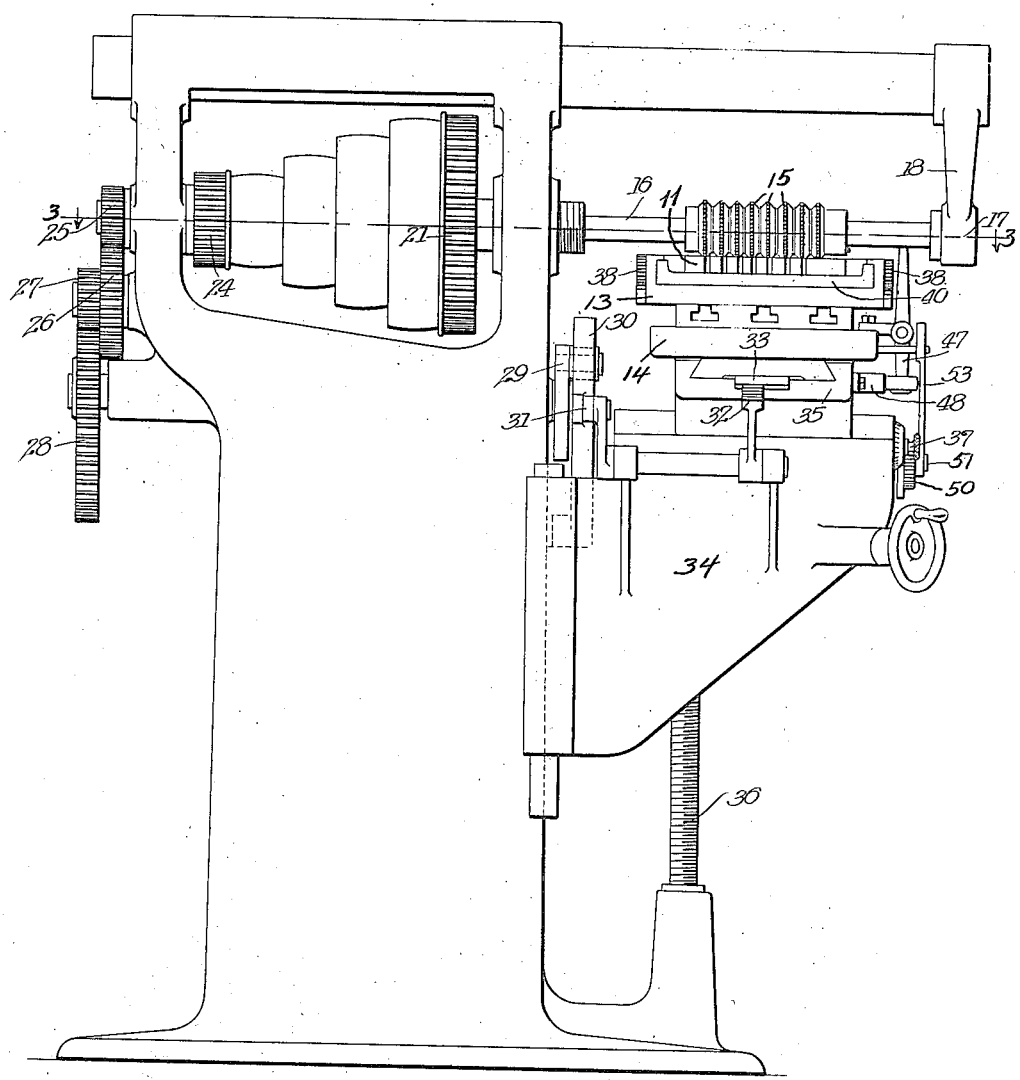

In the machine shown in Figs. 1 to 4, inclusive, the work blank 11 is clamped in any suitable manner on an arbor 12 slidably and rotatably mounted in a frame 13 adjustably secured on the reciprocatory table 14. The cutters 15 are secured on the spindle bar 16 which is journaled at its outer end in a suitable bearing 17 in the arm 18 of the machine and is supported and driven at its inner end by the main spindle 19 which is rotated by any convenient means, such as the belt driven cone pulley 20 and train of reduction gears 21, 22, 23 and 24, of well known construction as shown in Fig. 3.

Figure 2:
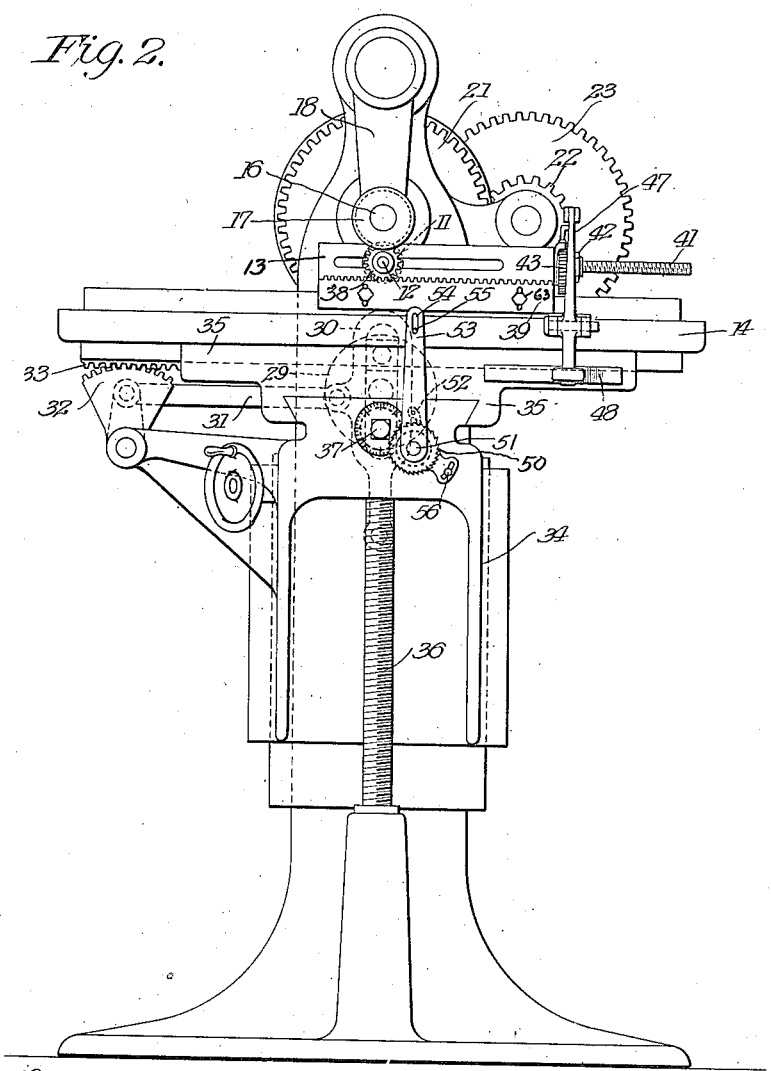
Fig. 2 is a front elevation of the same.

The reciprocating table 14 is moved back and forth continuously by any suitable means operated from the main spindle 19, such as the changeable speed reduction gears 25, 26, 27 and 28 and quick return motion crank 29, oscillating yoke 30, connecting rod 31 and gear sector 32 meshing with the rack 33 on the under side of the table (see Fig. 2). The connecting rod 31 is made long enough to permit the knee 34 that carries the table slideway 35 to be raised and lowered by the vertical adjusting screw 36 without appreciably affecting the reciprocatory movement of the table; and the table slideway 35 may be adjusted in and out on the knee by means of the cross feed screw 37 without affecting the reciprocating movement of the table, within the limits set by the width of the rack 33 and gear sector 32.

The frame 13 is provided with suitable means, such as screws 63 passing through transverse slots (see Figs. 3 and 4) whereby it may be clamped upon the table 14 so as to hold the work arbor 12 parallel to the table and at a suitable angle to the direction of its movement. As shown in Fig. 3, the work arbor is held at 90° to the direction of movement of the table; but for generating some forms of gearing, the angle may vary a few degrees either way depending upon the result desired. As shown in Fig. 5, the frame is clamped to hold the work arbor 12 at an angle of 82½° to the direction of movement of the table.

The work and arbor are held in proper angular position circumferentially by means of pinions 38 on the ends of the arbor which engage with racks 39 secured to the frame 13. These racks are below the pinions in the machine as illustrated, but may be positioned either above or below the pinions to suit the article to be formed. The pinions 38 may be changed to suit the work, the racks being adjustable vertically by means of the clamp screws 64 (see Figs. 2 and 6) in order to mesh properly. The sides of the frame are provided with ways for the slide 40 in which the ends of the arbor are journaled, and slots are left in the sides of the frame 13 through which the ends of the arbor project in order to permit the arbor to move with the slide. The slide 40 is moved by a screw 41 fixed to the slide and engaging a nut 42 rotatably mounted on the frame 13. The pinions 38 roll on the racks 39 as the slide moves and thereby turn the arbor proportionally to the amount of movement of the slide.

Figure 4:
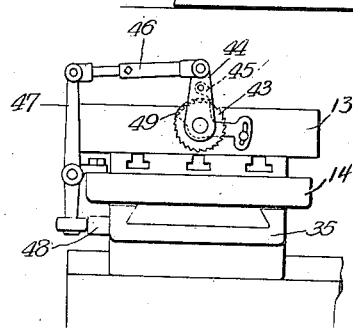
Fig. 4 is a fragmentary view showing the right hand end as seen in Fig. 2 of the sliding table and support therefor.

The nut 42 may be adjusted by hand to feed or position the slide 40 and work blank between cuts, or it may be rotated by automatic means, such as the ratchet 43 and lever 44 carrying a pawl 45, operated by a link 46 and the cam engaging lever 47 (carried by the table) from the cam 48 on the table slideway 35 (see Fig. 4). In order to adjust the amount of movement of the nut the pawl 45 rides idly on an adjustable sector 49, having a slightly greater radius than that of the extremities of the ratchet teeth and which may be turned to uncover one or more teeth of the ratchet 43 and thus permit the pawl to engage and turn the ratchet correspondingly in a manner well understood in the art.

A similar automatic device may be employed for actuating the cross feed screw 37. A ratchet wheel 50 is mounted on a short shaft 51 and connected by suitable gears to the cross feed screw. The pawl 52 for the ratchet wheel is mounted on a lever 53 which is pivoted on the shaft 51 and has a slot 54 at its upper end in which a pin 55 projects from the table 14. As the table reciprocates the lever is oscillated and turns the ratchet wheel (see Fig. 2.) A guard sector 56 is also pivoted on the shaft 51 to engage the pawl and hold it away from the ratchet during a part of its movement so as to enable the angular movement of the ratchet to be adjusted to suit the feed desired.

In the form of work support shown in Fig. 6, the arbor 12 is replaced by two axially alining chucks 57 provided with adjustable spindles 58 and mounted in sleeves 59 journaled in a slide 40 mounted in the frame 13, like the device shown in Figs. 1 to 4 and likewise having pinions 38 in mesh with the racks 39. The work blank 60 is clamped or pinned or otherwise secured between the opposing faces of the chucks 57 so as to be easily removable. In the device shown in the drawings, the work is secured in the chucks by set screws 61 carried in two diametrically disposed ears 62 on each chuck 57.

The machine operates automatically to cause the work blank to travel back and forth under the rotating cutters and at the beginning of each cutting stroke the table is fed laterally and the frame is moved lengthwise upon the table to rotate the work blank by the adjustable ratchet and pawl devices, thereby causing a succession of cuts to be made on the periphery of the work blank, each cut being displaced axially and circumferentially with respect to the adjoining cuts, and merging in a circumferential groove.

It is evident that by setting the frame 13 at a small angle to its direction of reciprocatory movement, as shown in Fig. 5, the lengthwise movement of the frame on the table will move it laterally, and by properly adjusting the angle to the lead of the thread desired and correspondingly changing the cross feed, the desired pitch may be produced. Also, by changing the size of the pinions 38 so as to require the slide to travel a greater or a less distance to cause complete rotation of the work arbor, the amount of axial movement of the work arbor thereby caused at a given angle of setting of the slide will be correspondingly increased or diminished. Hence it is possible to produce automatically a groove having its side walls composed of straight cuts taken at any desired angle to the axis of the work and displaced axially any desired proportion of the circumferential displacement whereby the principal characteristics may be made to suit the need of any particular case. The mode of operating the machine for producing such a product is more fully described in my pending application Serial No. 530,631, filed January 20, 1922, and Serial No. 542,955, filed March 11, 1922.

The invention is adapted to the production of tapered or conical articles by raising one side of the frame 13 with reference to the table 14. It is evident that elliptical articles may be produced by suitably changing the elevation of the knee in advance of each cut, although no automatic means for accomplishing this is illustrated.

The invention is not restricted to the articles, nor to the modes of operation and forms and arrangements of parts of the machines illustrated and described, as manifestly these may be adapted to the purposes in view. Claims for the article are expressly reserved for another application.

I claim the following as my invention:

1. A machine for forming circumferential grooves comprising a cutter support and cutter carried thereby, a table support adjustable vertically and laterally beneath said cutter, a table slidable lengthwise on said table support and means for reciprocating said table, a work support mounted on said table and having means for clamping the work, said clamping means being adjustable lengthwise of said work support, and means for rotating said clamping means in synchronism with its lengthwise movement for feeding the work to the cutter.

2. A machine for forming circumferential grooves comprising a cutter support and cutter carried thereby, a table support adjustable vertically and laterally beneath said cutter, a table slidable lengthwise on said table support and means for reciprocating said table, a work support mounted on said table and having rotatable means for clamping the work, said work support being adjustable at an angle of 90° or less to the direction of movement of said table, and said clamping means being adjustable lengthwise of said work support, and means for rotating said clamping means in synchronism with its lengthwise movement for feeding the work to the cutter.

3. In a machine of the character described, a cutter and means for rotating it, a work table and means for reciprocating it transversely of the cutter, a work carrier slidable on said table, and means for adjusting said table laterally in synchronism with the movement of said work carrier on said table.

4. In a machine of the character described, a cutter and means for rotating it, a work table and means for reciprocating it transversely of the cutter, a work carrier on said table, a work holder rotatably adjustable in said carrier, and means for adjusting said table laterally in synchronism with the rotatable adjustment of said work holder.

5. In a machine for producing a circumferential groove, a cutter and a rotatable work holder mounted for relative to and fro movement, means for adjusting said work holder laterally with reference to the axis of the work, said adjustment being lengthwise of the direction of said to and fro movement, and means for rotating said work holder in proportion to its lengthwise adjustment.

6. In a machine for producing a circumferential groove, a cutter and a rotatable work holder mounted for to and fro movement, means for adjusting said work holder lengthwise and crosswise of the direction of said to and fro movement, said adjustments being automatically effected and in proportion, and means for rotating said work holder in proportion to its lengthwise adjustment.

7. In a machine of the character described, a sliding table mounted for adjustment transversely of its direction of sliding movement, means for sliding said table back and forth comprising a rack fixed to said table and a gear engaging said rack, said rack being wider than said gear and said rack and gear having a combined width greater than the amount of transverse adjustment of said table.

8. In a machine of the character described, a sliding table mounted for adjustment transversely of its direction of sliding movement, means for sliding said table back and forth comprising a rack fixed to said table and a gear engaging said rack, said rack and gear having a combined width greater than the amount of transverse adjustment of said table, and means operated intermittently by the movement of said table for effecting said transverse adjustment, said means being variable to control the rate of transverse movement of said table.

9. In a machine of the character described, a horizontally sliding table, a vertically adjustable support for said sliding table, means for sliding said table back and forth comprising an oscillating arm on said support, an oscillating arm on a fixed part of said machine, and a connecting rod pivoted at its ends to said oscillating arms.

10. In a machine of the character described, a horizontally sliding table, a vertically adjustable support for said sliding table, means for sliding said table back and forth comprising a gear engaging said rack and mounted on a journal in said support, an oscillating arm carried thereby, an oscillating arm on a fixed part of said machine, and a connecting rod pivoted at its ends to said oscillating arms.

11. In a metal working machine, a sliding table, a laterally adjustable slideway for said table, a vertically adjustable support for said slideway, and means for sliding said table comprising a rack secured thereto, a gear engaging said rack and mounted in bearings carried by said slideway, an oscillating arm mounted on said slideway and connected to rotate said gear, a second oscillating arm mounted on a fixed part of said machine, a connecting rod between said arms, and means for oscillating said second arm.

12. In a metal working machine, a sliding table, a laterally adjustable slideway for said table, a vertically adjustable support for said slideway, and means for sliding said table comprising a rack secured thereto, a gear engaging said rack and mounted in bearings carried by said slideway, an oscillating arm mounted on said slideway and connected to rotate said gear, a second oscillating arm mounted on a fixed part of said machine, a connecting rod between said arms, and means for oscillating said second arm, including a crank, a block carried thereby, and a yoke carried by said second arm and surrounding said crank pin and block, said yoke being arranged to complete a cycle of movement back and forth for each revolution of the crank.

13. In a metal working machine, a sliding table, a laterally adjustable slideway for said table, a vertically adjustable support for said slideway, and means for sliding said table comprising a rack secured thereto, a gear engaging said rack and mounted in bearings carried by said slideway, an oscillating arm mounted on said slideway and connected to rotate said gear, a second oscillating arm mounted on a fixed part of said machine, a connecting rod between said arms, and means for oscillating said second arm, in combination with means for adjusting the position of said slideway and support during the reciprocating movement of said table.

14. In a machine of the character described, means for reciprocating the work back and forth across the line of cut, means for shifting said work lengthwise in its path of movement and means for rotating said work in proportion to the amount of shifting lengthwise.

15. In a machine of the character described, means for reciprocating the work back and forth across the line of cut, means for shifting said work lengthwise in its path of movement and means for rotating said work in proportion to the amount of shifting lengthwise, said rotating means being changeable to vary said proportion to suit the product desired.

16. In a machine of the character described, means for reciprocating the work back and forth across the line of cut, means for shifting said work lengthwise in its path of movement and means for rotating said work in proportion to the amount of shifting lengthwise, and means to shift said work crosswise in proportion to the amount of shifting lengthwise.

17. In a machine of the character described, rotatable means for supporting the work movable toward and from the line of cut, means for positioning said supporting means lengthwise and crosswise of its direction of to and fro movement, said positioning means being adjustable angularly with reference to the line of cut, and means for fixing the relative lengthwise and crosswise movement of said positioning means.

18. In combination with a movable support and a relatively fixed cutter, a work holding fixture carried by said support comprising an arbor having a clamping device adapted to receive and hold the work blank and a frame having journals for said arbor and adapted to be secured to said support to hold said arbor at a predetermined angle to said cutter, means for varying the position of said frame with reference to said support while maintaining said angle unchanged, and means for rotating said arbor in proportion to the movement of said frame varying means on said support.

19. In combination with a cutter and a rotatable support for a work blank, means for moving the blank support transversely of its axis of rotation toward and from the cutter, means for effecting periodic movement of the blank support in the general direction of its to and fro movement and at a predetermined angle thereto, and means for rotating the blank support in synchronism with said periodic movement.

20. In combination with a cutter and a rotatable support for a work blank, means for moving the blank support transversely of its axis of rotation toward and from the cutter, means for effecting periodic movement of the blank support in the general direction of its to and fro movement and at a predetermined angle thereto, and means for rotating the blank support in synchronism with said periodic movement, said rotating means being adjustable to vary the ratio of said synchronous movement.

21. In combination with a cutter and a rotatable support for a work blank, means for moving the blank support transversely of its axis of rotation toward and from the cutter, means for effecting periodic movement of the blank support in the general direction of its to and fro movement and at a predetermined angle thereto, means for moving the blank support in the general direction of its axis in synchronism with said periodic movement, and means for rotating the blank support in synchronism with said periodic movement.

In testimony whereof, I have signed my name to this specification.

HENRY J. SCHMICK.